US011908412B1

(12) United States Patent
Fan et al.

(10) Patent No.: US 11,908,412 B1
(45) Date of Patent: Feb. 20, 2024

(54) PIXEL DRIVING CIRCUIT AND DISPLAY PANEL

(71) Applicant: HKC CORPORATION LIMITED, Guangdong (CN)

(72) Inventors: Tao Fan, Guangdong (CN); Haijiang Yuan, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/340,145

(22) Filed: Jun. 23, 2023

(30) Foreign Application Priority Data

Oct. 11, 2022 (CN) ......................... 202211241984.3

(51) Int. Cl.
*G09G 3/3233* (2016.01)

(52) U.S. Cl.
CPC ... *G09G 3/3233* (2013.01); *G09G 2300/0842* (2013.01); *G09G 2310/0202* (2013.01); *G09G 2310/0262* (2013.01); *G09G 2310/0294* (2013.01); *G09G 2310/08* (2013.01); *G09G 2320/0233* (2013.01)

(58) Field of Classification Search
CPC ......... G09G 3/3233; G09G 2300/0842; G09G 2310/0202; G09G 2310/0262; G09G 2310/0294; G09G 2310/08; G09G 2320/0233
See application file for complete search history.

(56) References Cited

U.S. PATENT DOCUMENTS

2006/0208977 A1* 9/2006 Kimura .................... G09G 3/30 345/76
2022/0319418 A1* 10/2022 Yu ........................ G09G 3/3233

FOREIGN PATENT DOCUMENTS

CN 1591104 A 3/2005
CN 1848223 A 10/2006
CN 103413521 A 11/2013
CN 106847182 A 6/2017
CN 108711400 A 10/2018
CN 109584786 A 4/2019
(Continued)

OTHER PUBLICATIONS

First Office Action issued in corresponding CN Application No. 202211241984.3 dated Nov. 16, 2022.
(Continued)

*Primary Examiner* — Stacy Khoo
(74) *Attorney, Agent, or Firm* — HAUPTMAN HAM, LLP

(57) ABSTRACT

A pixel driving circuit and a display panel are provided. The pixel driving circuit includes a scan line, a data line, a capacitor, a switch module, and a driving transistor. A scanning voltage is at a first level in a sampling phase and in a light-emitting phase, and at a second level in a data writing phase. A data voltage is at a high level in the sampling phase, and at a low level in the data writing phase and in the light-emitting phase. The capacitor includes a first capacitor-terminal and a second capacitor-terminal. The driving transistor includes a gate terminal electrically connected with the second capacitor-terminal, a source terminal electrically connected with the scan line, and a drain terminal configured to be electrically connected with the gate terminal in the sampling phase and be disconnected from the gate terminal in the data writing phase.

14 Claims, 4 Drawing Sheets

(56) References Cited

FOREIGN PATENT DOCUMENTS

| | | | |
|---|---|---|---|
| CN | 111048044 | A | 4/2020 |
| CN | 111613180 | A | 9/2020 |
| JP | 2010091608 | A | 4/2010 |
| WO | 2021070368 | A1 | 4/2021 |

OTHER PUBLICATIONS

WIPO, International Search Report and Written Opinion for International Application No. PCT/CN2023/109156, dated Sep. 22, 2023.

* cited by examiner

PIXEL DRIVING CIRCUIT AND DISPLAY PANEL

CROSS-REFERENCE TO RELATED APPLICATIONS

This application claims priority under 35 U.S.C. § 119(a) to Chinese Patent Application No. 202211241984.3, filed Oct. 11, 2022, the entire disclosure of which is incorporated herein by reference.

TECHNICAL FIELD

This disclosure relates to the field of display technology, and in particular to a pixel driving circuit and a display panel.

BACKGROUND

With development of photoelectric display technology and semiconductor manufacturing technology, display panels with Thin Film Transistors (TFTs) have become more and more mature. In terms of thickness, color saturation, contrast, flexible display, etc., Organic Light-Emitting Diode (OLED) display panels have obvious advantages, and the OLED display panels have wide development prospects.

SUMMARY

In a first aspect, a pixel driving circuit is provided in the present disclosure. The pixel driving circuit has an operating phase including a sampling phase, a data writing phase, and a light-emitting phase. The pixel driving circuit includes a scan line, a data line, a capacitor, a switch module, and a driving transistor. The scan line is configured to provide a scanning voltage. The scanning voltage is at a first level in the sampling phase and the light-emitting phase, and at a second level in the data writing phase. One of the first level and the second level is a high level, and another of the first level and the second level is a low level. The data line is configured to provide a data voltage. The data voltage is at a high level in the sampling phase, and at a low level in the data writing phase and the light-emitting phase. The capacitor includes a first capacitor-terminal and a second capacitor-terminal. The first capacitor-terminal is electrically connected with the data line in both the sampling phase and the data writing phase. The switch module has one end electrically connected with the data line and another end electrically connected with the first capacitor-terminal. The switch module is configured to be turned on in the sampling phase and the data writing phase, and turned off in the light-emitting phase. The driving transistor includes a gate terminal, a source terminal, and a drain terminal. The source terminal is electrically connected with the scan line. The gate terminal is electrically connected with the second capacitor-terminal. The drain terminal is configured to be electrically connected with the gate terminal in the sampling phase and be disconnected from the gate terminal in the data writing phase.

In a second aspect, a display panel is provided in the present disclosure. The display panel includes the pixel driving circuit. The pixel driving circuit has an operating phase including a sampling phase, a data writing phase, and a light-emitting phase. The pixel driving circuit includes a scan line, a data line, a capacitor, a switch module, and a driving transistor. The scan line is configured to provide a scanning voltage. The scanning voltage is at a first level in the sampling phase and the light-emitting phase, and at a second level in the data writing phase. One of the first level and the second level is a high level, and another of the first level and the second level is a low level. The data line is configured to provide a data voltage. The data voltage is at a high level in the sampling phase, and at a low level in the data writing phase and the light-emitting phase. The capacitor includes a first capacitor-terminal and a second capacitor-terminal. The first capacitor-terminal is electrically connected with the data line in both the sampling phase and the data writing phase. The switch module has one end electrically connected with the data line and another end electrically connected with the first capacitor-terminal. The switch module is configured to be turned on in the sampling phase and the data writing phase, and turned off in the light-emitting phase. The driving transistor includes a gate terminal, a source terminal, and a drain terminal. The source terminal is electrically connected with the scan line. The gate terminal is electrically connected with the second capacitor-terminal. The drain terminal is configured to be electrically connected with the gate terminal in the sampling phase and be disconnected from the gate terminal in the data writing phase.

BRIEF DESCRIPTION OF THE DRAWINGS

In order to explain technical solutions in implementations of the present disclosure more clearly, the following will give a brief introduction to accompanying drawings which are needed to be used in description of implementations. Apparently, the accompanying drawings in the following description are some implementations of the present disclosure. For those of ordinary skill in the art, other accompanying drawings can be obtained according to these accompanying drawings without creative efforts.

Figure 1:
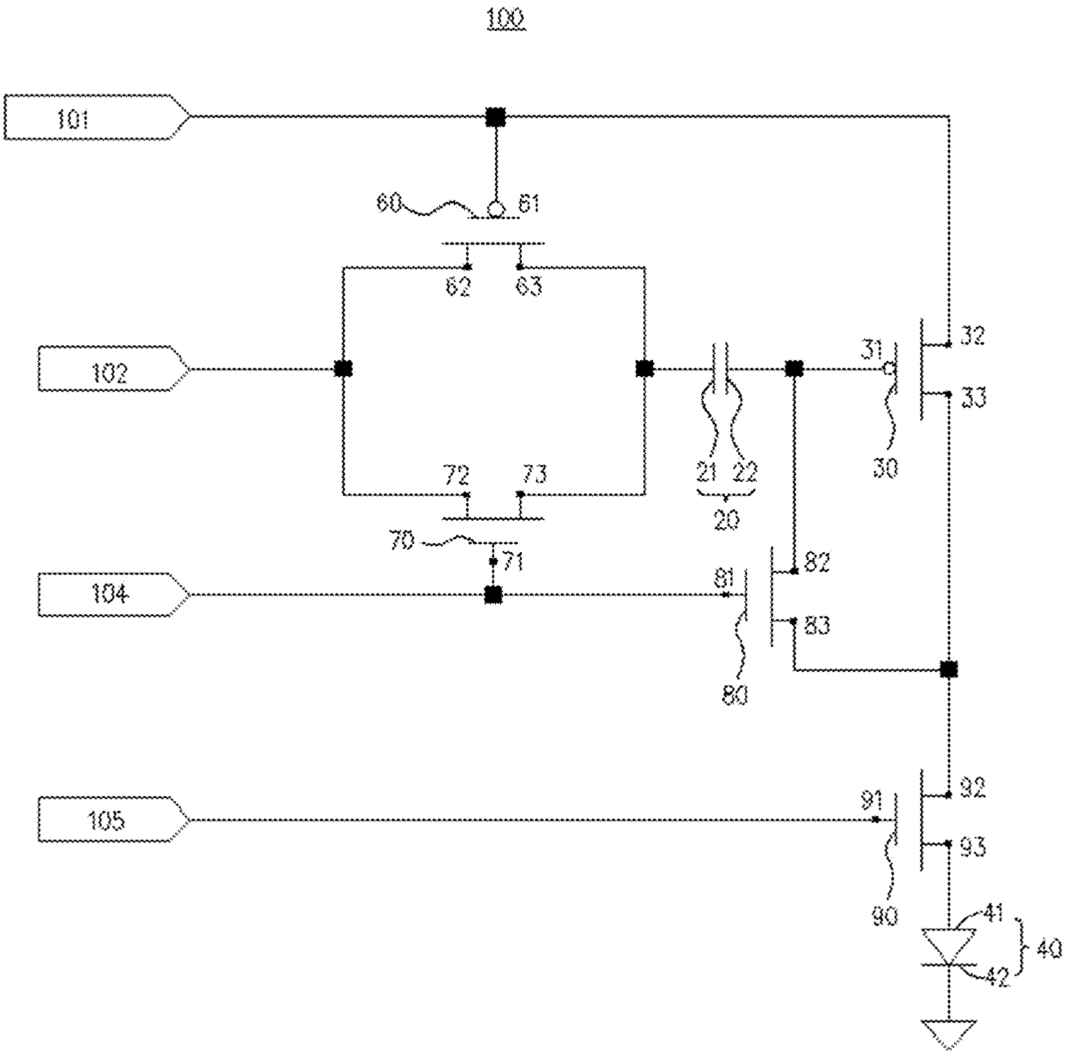
FIG. 1 is a schematic circuit diagram of a pixel driving circuit provided in implementations of the present disclosure.

REFERENCE SIGNS display panel—1000, pixel driving circuit—100, control chip—200, scan line—101, data line—102, first control signal line—103, second control signal line—104, third control signal line—105, capacitor—20, first capacitor-terminal—21, second capacitor-terminal—22, driving transistor—gate terminal—31, source terminal—32, drain terminal—33, Light-Emitting Diode (LED)—40, positive terminal—41, negative terminal—42, first switch—50, first control terminal—51, first terminal—52, second terminal—53, second switch—60, second control terminal—61, third terminal—62, fourth terminal—63, third switch—70, third control terminal—71, fifth terminal—72, sixth terminal—73, fourth switch—80, fourth control terminal—81, seventh terminal—82, eighth terminal—83, fifth switch—90, fifth control terminal—91, ninth terminal—92, tenth terminal—93.

DETAILED DESCRIPTION

Technical solutions of implementations of the present disclosure will be described clearly and completely with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

The term “embodiment” or “implementation” referred to herein means that a particular feature, structure, or characteristic described in conjunction with the embodiment or implementation may be contained in at least one implementation of the present disclosure. The phrase appearing in various places in the specification does not necessarily refer to the same implementation, nor does it refer to an independent or alternative embodiment that is mutually exclusive with other implementations. It is expressly and implicitly understood by those of skilled in the art that implementations described herein may be combined with other implementations.

It should be noted that the terms such as “first”, “second”, etc., in the specification, the claims, and the above accompanying drawings of the present disclosure are used to distinguish different objects, rather than describing a particular order. Furthermore, the terms “including”, “comprising”, and “having” as well as variations thereof are intended to cover non-exclusive inclusion.

In the specification, for the sake of convenience, terms such as “middle”, “upper”, “lower”, “front”, “rear”, “vertical”, “horizontal”, “top”, “bottom”, “inside”, “outside”, and the like indicating a directional relationship or positional relationship are used for describing a positional relationship between elements based on the accompanying drawings and are only for the convenience of illustration and simplicity, rather than explicitly or implicitly indicate that apparatuses or components referred to herein must have a certain direction or be structured or operated in a certain direction and therefore cannot be understood as limitation on the disclosure. The positional relationship between elements is appropriately changed according to the directions of the described elements. Therefore, it is not limited to the terms described in the specification, and can be appropriately replaced according to actual needs.

In the specification, unless stated otherwise, terms “installation”, “coupling”, “connection”, and the like should be understood in broader sense. For example, coupling may be a fixed coupling, a removable coupling, or an integrated coupling, may be a mechanical coupling, or an electrical coupling, and may be a direct coupling, an indirect coupling through a medium, or a communication coupling between two components. For those of ordinary skill in the art, the above terms in the disclosure can be understood according to specific situations.

An Active-Matrix Organic Light-Emitting Diode (AMOLED) is recognized as one of the most promising display technologies in the industry due to advantages thereof such as self-luminescence, low power consumption, wide viewing angle, high color gamut, high contrast, rapid response, and the like. To realize accurate AMOLED control, pixel driving needs to be performed by using a Thin Film Transistor (TFT) technology. At present, mainstream TFT technologies mainly include a α-si TFT technology, a Low-Temperature Polycrystalline Silicon (LTPS) TFT technology, and an Oxide TFT technology. The α-si TFT technology is not suitable for AMOLED driving due to disadvantages thereof such as poor stability, low carrier mobility and the like, and LTPS is considered as the most suitable TFT technology for the AMOLED driving due to the best stability and the highest carrier mobility among the a-si TFT technology, the LTPS TFT technology, the Oxide TFT technology. However, the LTPS technology is limited to be applied in mass production due to disadvantages such as relatively complicated process and poor evenness in large-size application.

In the related art, an organic light-emitting diode (OLED) display panel includes a driving circuit that is driven by a direct current (DC) power supply, and there is an individual power supply line for supplying a DC voltage to each pixel. The power supply line itself has a certain degree of internal resistance, such that a voltage drop of a voltage transmitted to a light-emitting device is relatively large. In addition, due to reasons such as an unstable manufacturing process and a limited technology of the OLED display panel, a thickness of the power supply line in different regions may change, which results in different voltage drops of pixel driving voltages in various regions, thereby causing the OLED display panel to have uneven brightness.

In addition, driving transistors of various pixel units in the OLED display panel may have different threshold voltages, which may cause light-emitting diodes (LEDs) in various pixel units to have inconsistent currents, such that the OLED display panel has uneven brightness. Moreover, with the elapse of driving time of the driving transistor, a material of the driving transistor will be aged and mutated, such that a threshold voltage drift occurs to the driving transistor, display unevenness also occurs to the OLED display panel, and this uneven display phenomenon will become more serious with the elapse of the driving time and aging of the material of the driving transistor.

How to make display brightness of the OLED display panel more even becomes a technical problem to be solved.

A purpose of the present disclosure is to provide a pixel driving circuit and a display panel, so as to avoid display unevenness of the display panel.

In a first aspect, a pixel driving circuit is provided in the present disclosure. The pixel driving circuit has an operating phase including a sampling phase, a data writing phase, and a light-emitting phase. The pixel driving circuit includes a scan line, a data line, a capacitor, a switch module, and a driving transistor. The scan line is configured to provide a scanning voltage. The scanning voltage is at a first level in the sampling phase and the light-emitting phase, and at a second level in the data writing phase. One of the first level and the second level is a high level, and another of the first level and the second level is a low level. The data line is configured to provide a data voltage. The data voltage is at a high level in the sampling phase, and at a low level in the data writing phase and the light-emitting phase. The capacitor includes a first capacitor-terminal and a second capacitor-terminal. The first capacitor-terminal is electrically connected with the data line in both the sampling phase and the data writing phase. The switch module has one end electrically connected with the data line and another end electrically connected with the first capacitor-terminal. The switch module is configured to be turned on in the sampling phase and the data writing phase, and turned off in the light-emitting phase. The driving transistor includes a gate terminal, a source terminal, and a drain terminal. The source terminal is electrically connected with the scan line. The gate terminal is electrically connected with the second capacitor-terminal. The drain terminal is configured to be electrically connected with the gate terminal in the sampling phase and be disconnected from the gate terminal in the data writing phase.

In the pixel driving circuit provided in the present disclosure, the source terminal of the driving transistor is electrically connected with the scan line, the gate terminal of the driving transistor is electrically connected with the data line through the capacitor, and the drain terminal of the driving transistor is controlled to be electrically connected with the gate terminal of the driving transistor in the sampling phase, such that the driving transistor forms a diode-like structure to reach a balanced state, and a voltage at the gate terminal satisfies: $V_G=V_{SCAN}-V_{TH}$ In the data writing phase, the drain terminal of the driving transistor is controlled to be disconnected from the gate terminal of the driving transistor, and the data voltage in the data line jumps from a high level to a low level. Due to a capacitive coupling effect, the voltage at the gate terminal jumps to $V_G=V_{SCAN}-V_{TH}-V_{DATA}$. It can be seen that according to a driving current formula in a subsequent light-emitting phase, a driving current is independent of a threshold voltage $V_{TH}$, such that an influence of the threshold voltage $V_{TH}$ on the driving current is reduced or even eliminated, thereby avoiding the display unevenness of the display panel. In addition, compared with a driving circuit in the related art in which one power supply line with an internal resistance provides a Direct Current (DC) voltage to each pixel to make a voltage drop of a voltage transmitted to a light-emitting device relatively large, a power supply line may not be disposed in the pixel driving circuit provided in the present disclosure, and instead, the scan line is utilized to replace the power supply line to supply a voltage to the pixel driving circuit, such that a voltage drop of a pixel driving voltage in each region of the display panel is greatly reduced, which facilitates further improving display evenness of the display panel.

In implementations, the pixel driving circuit further includes a LED. The LED has a positive terminal and a negative terminal. The negative terminal is grounded. The positive terminal is configured to be disconnected from the drain terminal in both the sampling phase and the data writing phase. The positive terminal is configured to be electrically connected with the drain terminal in the light-emitting phase.

In implementations, the switch module includes a first switch. The first switch includes a first control terminal, a first terminal, and a second terminal. The first terminal is electrically connected with the data line. The second terminal is electrically connected with the first capacitor-terminal. The pixel driving circuit further includes a first control signal line electrically connected with the first control terminal. The first control signal line is configured to provide a first control voltage. The first control voltage is at a third level in the sampling phase and the data writing phase. The first control voltage is at a fourth level in the light-emitting phase. One of the third level and the fourth level is a high level, and another of the third level and the fourth level is a low level.

In implementations, the switch module includes a second switch and a third switch. The second switch includes a second control terminal, a third terminal, and a fourth terminal. The third switch includes a third control terminal, a fifth terminal, and a sixth terminal. The third terminal and the fifth terminal each are electrically connected with the data line. The fourth terminal and the sixth terminal each are electrically connected with the first capacitor-terminal. The second control terminal is electrically connected with the scan line. The pixel driving circuit further includes a second control signal line electrically connected with the third control terminal. The second control signal line is configured to provide a second control voltage. The second control voltage is at a fifth level in the sampling phase. The second control voltage is at a sixth level in the data writing phase and the light-emitting phase. One of the fifth level and the sixth level is a high level, and another of the fifth level and the sixth level is a low level.

In implementations, the pixel driving circuit further includes a fourth switch. The fourth switch includes a fourth control terminal, a seventh terminal, and an eighth terminal. The seventh terminal is electrically connected with the gate terminal. The eighth terminal is electrically connected with the drain terminal. The fourth control terminal is electrically connected with the second control signal line.

In implementations, the pixel driving circuit further includes a fifth switch. The fifth switch includes a fifth control terminal, a ninth terminal, and a tenth terminal. The ninth terminal is electrically connected with the drain terminal. The tenth terminal is electrically connected with the positive terminal. The pixel driving circuit further includes a third control signal line electrically connected with the fifth control terminal. The third control signal line is configured to provide a third control voltage. The third control voltage is at a seventh level in the sampling phase and the data writing phase. The third control voltage is at an eighth level in the light-emitting phase. One of the seventh level and the eighth level is a high level, another of the seventh level and the eighth level is a low level.

In implementations, the driving transistor and the second switch each are a P-type TFT. The third switch, the fourth switch, and the fifth switch each are an N-type TFT. The fifth level is the high level. The sixth level is the low level. The seventh level is the low level. The eighth level is the high level.

In implementations, the driving transistor, the second switch, the third switch, the fourth switch, and the fifth switch each are a P-type thin film transistor. The fifth level is the low level. The sixth level is the high level. The seventh level is the high level. The eighth level is the low level.

In a second aspect, a display panel is provided in the present disclosure. The display panel includes the pixel driving circuit. The pixel driving circuit has an operating phase including a sampling phase, a data writing phase, and a light-emitting phase. The pixel driving circuit includes a scan line, a data line, a capacitor, a switch module, and a driving transistor. The scan line is configured to provide a scanning voltage. The scanning voltage is at a first level in the sampling phase and the light-emitting phase, and at a second level in the data writing phase. One of the first level and the second level is a high level, and another of the first level and the second level is a low level. The data line is configured to provide a data voltage. The data voltage is at a high level in the sampling phase, and at a low level in the data writing phase and the light-emitting phase. The capacitor includes a first capacitor-terminal and a second capacitor-terminal. The first capacitor-terminal is electrically connected with the data line in both the sampling phase and the data writing phase. The switch module has one end electrically connected with the data line and another end electrically connected with the first capacitor-terminal. The switch module is configured to be turned on in the sampling phase and the data writing phase, and turned off in the light-emitting phase. The driving transistor includes a gate terminal, a source terminal, and a drain terminal. The source terminal is electrically connected with the scan line. The gate terminal is electrically connected with the second capacitor-terminal. The drain terminal is configured to be electrically connected with the gate terminal in the sampling phase and be disconnected from the gate terminal in the data writing phase.

Figure 2:
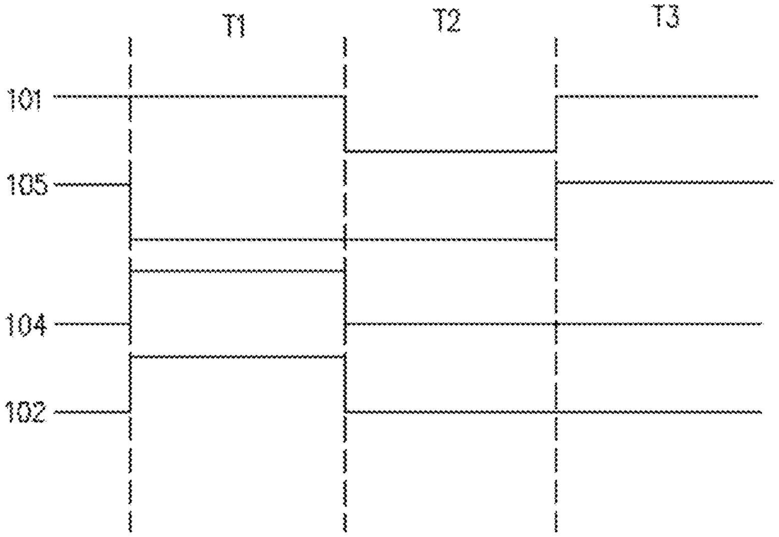
FIG. 2 is a sequence diagram of a pixel driving circuit provided in implementations of the present disclosure.

Referring to FIG. 1 and FIG. 2, a pixel driving circuit 100 is provided in the present disclosure, and can improve the uneven display phenomenon of the OLED display panel.

An operating phase of the pixel driving circuit 100 includes a sampling phase T1 and a data writing phase T2.

The pixel driving circuit 100 includes a scan line 101, a data line 102, a capacitor 20, and a driving transistor 30.

The scan line 101 is configured to provide a scanning voltage. The scanning voltage is at a first level in the sampling phase T1 and at a second level in the data writing phase T2. One of the first level and the second level is a high level, and the other of the first level and the second level is a low level.

The data line 102 is configured to provide a data voltage, the data voltage is at a high level in the sampling phase T1 and is at a low level in the data writing phase T2.

The capacitor 20 includes a first capacitor-terminal 21 and a second capacitor-terminal 22. The first capacitor-terminal 21 is electrically connected with the data line 102 in both the sampling phase T1 and the data writing phase T2.

The driving transistor 30 includes a gate terminal 31, a source terminal 32, and a drain terminal 33. The source terminal 32 is electrically connected with the scan line 101. The gate terminal 31 is electrically connected with the second capacitor-terminal 22. The drain terminal 33 is configured to be electrically connected with the gate terminal 31 in the sampling phase T1, and is disconnected from the gate terminal 31 in the data writing phase T2.

In this implementation, when the operating phase of the pixel driving circuit 100 is the sampling phase T1, the scanning voltage provided by the scan line 101 is at the first level. In this implementation, the first level is a high level, and in other implementations, the first level may also be a low level. Voltage $V_S$ at the source terminal 32 is equal to scanning voltage $V_{SCAN}$ in the scan line 101, that is, $V_S=V_{SCAN}$. The data voltage provided by the data line 102 is at a high level. The first capacitor-terminal 21 is electrically connected with the data line 102 in the sampling phase T1, such that voltage $V_A$ at the first capacitor-terminal 21 satisfies: $V_A=V_{DATA}$.

In this implementation, the driving transistor 30 is a P-type thin film transistor (TFT). The drain terminal 33 of the driving transistor 30 is electrically connected with the gate terminal 31 of the driving transistor 30 in the sampling phase T1, such that the driving transistor 30 forms a diode-like structure, and a voltage of the driving transistor 30 is in a balanced state. In other words, a difference between voltage $V_G$ at the gate terminal 31 of the driving transistor 30 and voltage $V_S$ at the source terminal 32 of the driving transistor 30 is equal to threshold voltage $V_{TH}$ of the driving transistor 30, that is, $V_G=V_{TH}$, and according to a formula $V_{SG}=V_S-V_G$, it can be deduced that $V_G=V_{SCAN}-V_{TH}$.

For the pixel driving circuit 100 in the sampling phase T1, how the first capacitor-terminal 21 is electrically connected with the data line 102 and how the drain terminal 33 is electrically connected with the gate terminal 31 are not limited in the present disclosure, which will be described in detail below.

When the operating phase of the pixel driving circuit 100 is the data writing phase T2, the scanning voltage is at the second level. In this implementation, the second level is a low level, and in other implementations, the second level may also be a high level. The data voltage provided by the data line 102 is at a low level. In the data writing phase T2, the first capacitor-terminal 21 is electrically connected with the data line 102. Therefore, voltage $V_A$ at the first capacitor-terminal 21 satisfies: $V_A=0$. Due to a coupling effect of the capacitor 20, a voltage at the second capacitor-terminal 22, that is, the gate terminal 31, jumps to $V_G=V_{SCAN}-V_{TH}-V_{DATA}$.

In the related art, an expression for a driving current generated by the driving transistor satisfies:

$$I_{OLED}=\frac{1}{2}\times\mu\times\frac{W}{L}\times C_{GI}\times(V_{SG}-V_{TH})^2,$$

where μ is a carrier mobility, W is a channel width, L is a channel length, $C_{GI}$ is a gate capacitance, $V_{TH}$ is a threshold voltage, W and L have been fixed in the design, and $C_{GI}$ depends on a thickness of a gate insulating layer and a material of the gate insulating layer. It can be seen that factors affecting the driving current and light-emitting brightness of an OLED device include carrier mobility μ, threshold voltage $V_{TH}$, and $V_{SG}$. $V_{SG}=V_S-V_G$, that is, $V_{SG}$ is related to a data voltage and a power-supply voltage. However, in this implementation, through the operation of the pixel driving circuit 100 in the sampling phase T1 and the data writing phase T2, the expression for the driving current generated by the driving transistor 30 may be simplified as:

$$I_{OLED}=\frac{1}{2}\times\mu\times\frac{W}{L}\times C_{GI}\times(V_{SG}-V_{TH})^2=\frac{1}{2}\times\mu\times\frac{W}{L}\times C_{GI}\times(V_S-V_G-V_{TH})^2=\frac{1}{2}\times\mu\times\frac{W}{L}\times C_{GI}\times(V_{SCAN}+V_{TH}+V_{DATA}-V_{SCAN}-V_{TH})^2=\frac{1}{2}\times\mu\times\frac{W}{L}\times C_{GI}\times(V_{DATA})^2,$$

where it can be obtained through formula derivation that the driving current generated by the driving transistor 30 in the present disclosure is finally determined only by μ, W, L, $C_{GI}$, and data voltage $V_{DATA}$.

In the pixel driving circuit 100 provided in the present disclosure, the source terminal 32 of the driving transistor 30 is electrically connected with the scan line 101, the gate terminal 31 of the driving transistor 30 is electrically connected with the data line 102 through the capacitor 20, and in the sampling phase T1, the drain terminal 33 of the driving transistor 30 is controlled to be electrically connected with the gate terminal 31 of the driving transistor 30 in the sampling phase T1, such that the driving transistor 30 forms a diode-like structure to reach a balanced state, and voltage $V_G$ at the gate terminal 31 satisfies: $V_{SG}=V_S-V_G$. In the data writing phase T2, the drain terminal 33 of the driving transistor 30 is controlled to be disconnected from the gate terminal 31 of the driving transistor 30, and the data line 102 jumps from a high level to a low level. Due to a capacitive coupling effect, the voltage at the gate terminal 31 jumps to $V_G=V_{SCAN}-V_{TX}-V_{DATA}$. It can be seen that according to a driving current formula in a subsequent light-emitting phase T3, a driving current is independent of threshold voltage $V_{TH}$, such that the influence of the threshold voltage $V_{TH}$ on the driving current is reduced or even eliminated, thereby avoiding the display unevenness of the display panel. In addition, compared with a driving circuit in the related art in which one power supply line with an internal resistance provides a direct current (DC) voltage to each pixel to make a voltage drop of a voltage transmitted to a light-emitting device relatively large, a power supply line may not be disposed in the pixel driving circuit 100 provided in the present disclosure, and instead, the scan line 101 is utilized to replace the power supply line to supply a voltage to the pixel driving circuit 100, such that a voltage drop of a pixel driving voltage in each region of the display panel is greatly reduced, and is beneficial to further improve the display evenness of the display panel.

The operating phase of the pixel driving circuit 100 further includes a light-emitting phase T3. The scanning voltage is at the first level in the light-emitting phase T3. The data voltage is at a low level in the light-emitting phase T3.

The pixel driving circuit 100 further includes a Light-Emitting Diode (LED) 40. The LED 40 has a positive terminal 41 and a negative terminal 142. The negative terminal 142 is grounded. The positive terminal 41 is configured to be disconnected from the chain end 133 in both the sampling phase T1 and the data writing phase T2. The positive terminal 41 is configured to be electrically connected with the drain terminal 33 in the light emission phase T3.

In this implementation, the driving current generated by the driving transistor 30 is independent of threshold voltage $V_{TH}$ of the driving transistor 30, such that an influence of threshold voltage $V_{TH}$ on the driving current is reduced or even eliminated, and a current flowing through the LED 40 is stable, thereby ensuring that light-emitting brightness of the LED 40 is even and improving a display effect of an image.

Figure 3:
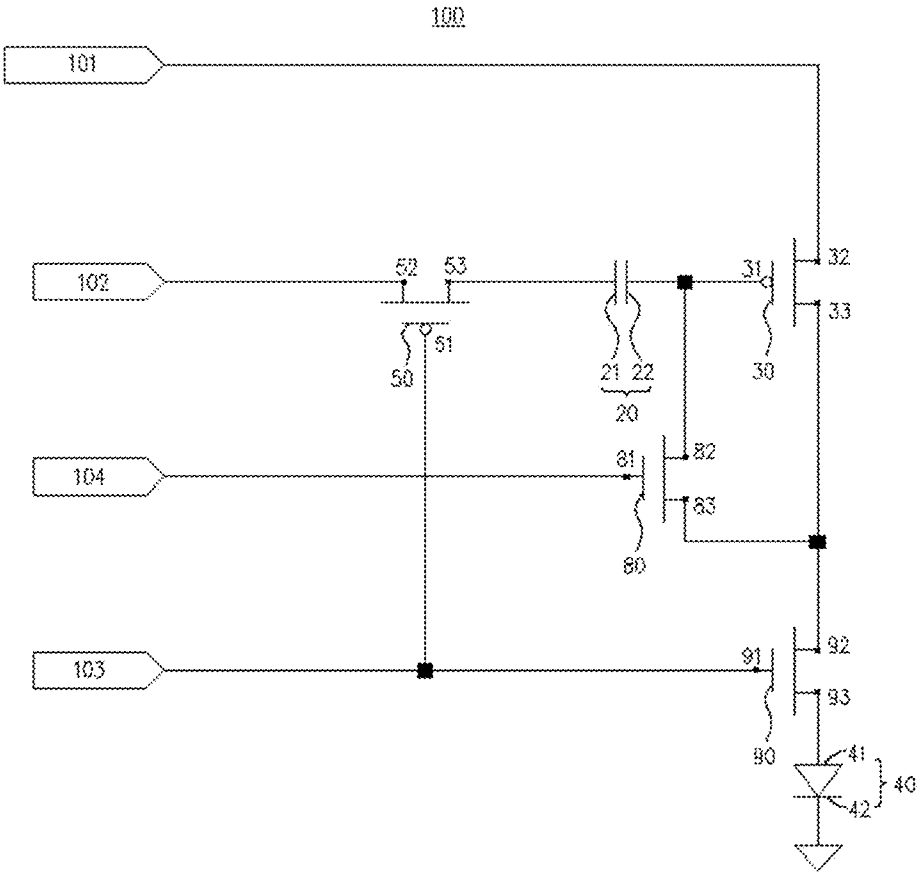
FIG. 3 is a schematic circuit diagram of a pixel driving circuit provided in other implementations of the present disclosure.
Figure 4:
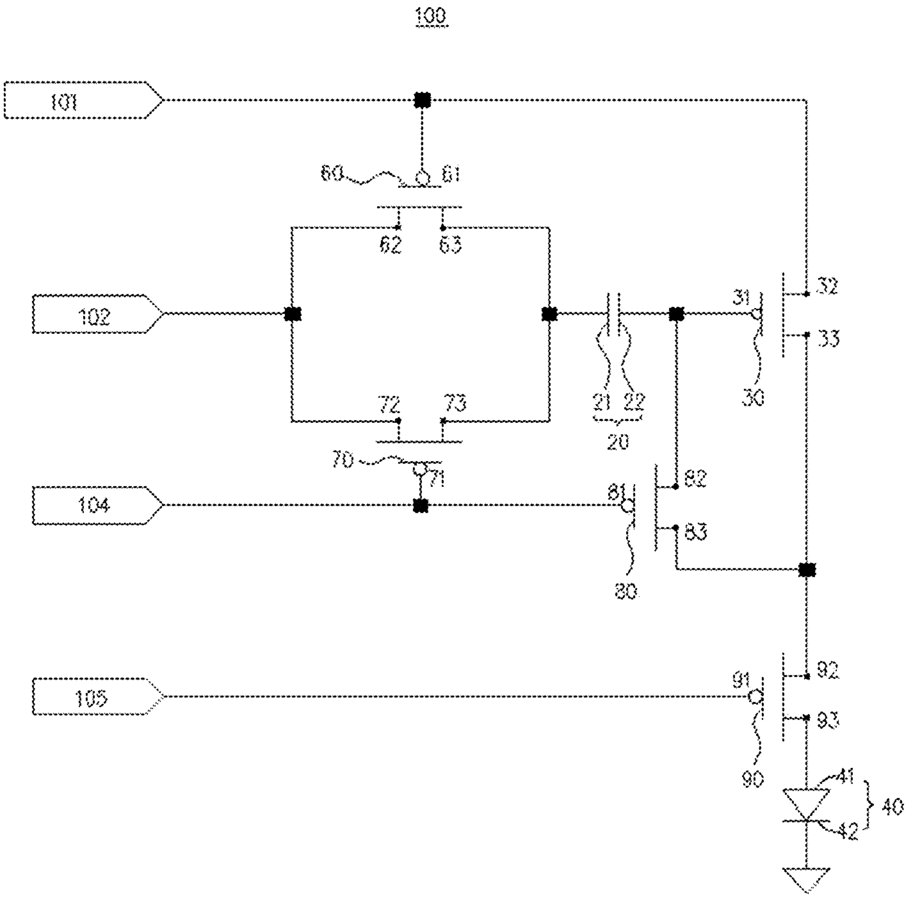
FIG. 4 is a schematic circuit diagram of a pixel driving circuit provided in other implementations of the present disclosure.

Referring to FIG. 1, FIG. 3, and FIG. 4, the pixel driving circuit 100 further includes a switch module. The switch module has one end electrically connected with the data line 102 and the other end electrically connected with the first capacitor-terminal 21. The switch module is configured to be turned on in the sampling phase T1 and the data writing phase T2, and turned off in the light-emitting phase T3. A manner of electrical connection between the data line 102 and the first capacitor-terminal 21 includes, but is not limited to, following implementations.

In an implementation, referring to FIG. 3, the switch module includes a first switch 50. The first switch 50 includes a first control terminal 51, a first terminal 52, and a second terminal 53. The first terminal 52 is electrically connected with the data line 102. The second terminal 53 is electrically connected with the first capacitor-terminal 21.

The pixel driving circuit 100 further includes a first control signal line 103 electrically connected with the first control terminal 51. The first control signal line 103 is configured to provide a first control voltage. The first control voltage is at a third level in the sampling phase T1 and the data writing phase T2. The first control voltage is at a fourth level in the light-emitting phase T3. One of the third level and the fourth level is a high level, and the other of the third level and the fourth level is a low level.

The first control voltage is at the third level in the sampling phase T1 and the data writing phase T2, and the first switch 50 is turned on, such that the data line 102 is electrically connected with the first capacitor-terminal 21. The first control voltage is at the fourth level in the light-emitting phase T3, and the first switch 50 is turned off, such that the data line 102 is electrically disconnected from the first capacitor-terminal 21.

In another implementation, referring to FIG. 4, the switch module includes a second switch 60 and a third switch 70. The second switch 60 includes a second control terminal 61, a third terminal 62, and a fourth terminal 63. The third switch 70 includes a third control terminal 71, a fifth terminal 72, and a sixth terminal 73. The third terminal 62 and the fifth terminal 72 each are electrically connected with the data line 102. The fourth terminal 63 and the sixth terminal 73 each are electrically connected with the first capacitor-terminal 21.

The second control terminal 61 is electrically connected with the scan line 101. The pixel driving circuit 100 further includes a second control signal line 104 electrically connected with the third control terminal 71. The second control signal line 104 is configured to provide a second control voltage. The second control voltage is at a fifth level in the sampling phase T1. The second control voltage is at a sixth level in the data writing phase T2 and the light-emitting phase T3. One of the fifth level and the sixth level is a high level, and the other of the fifth level and the sixth level is a low level.

The second control terminal 61 is electrically connected with the scan line 101, the scanning voltage is at the first level in the sampling phase T1, the second switch 60 is turned off, the second control voltage is at the fifth level in the sampling phase T1, and the third switch 70 is turned on; and the scanning voltage is at the second level in the data writing phase T2, and the second switch 60 is turned on, such that it is ensured that the data line 102 is electrically connected with the first capacitor-terminal 21 in the sampling phase T1 and the data writing phase T2.

The scanning voltage is at the first level in the light-emitting phase T3, the second switch 60 is turned off, the second control voltage is at the sixth level in the light-emitting phase T3, and the third switch 70 is turned off, such that it is ensured that the data line 102 is electrically connected with the first capacitor-terminal 21 in the light-emitting phase T3.

In an implementation, referring to FIGS. 1 and 3, the pixel driving circuit 100 further includes a fourth switch 80. The fourth switch 80 includes a fourth control terminal 81, a seventh terminal 82, and an eighth terminal 83. The seventh terminal 82 is electrically connected with the gate terminal 31. The eighth terminal 83 is electrically connected with the drain terminal 33. The fourth control terminal 81 is electrically connected with the second control signal line 104.

The second control voltage is at the fifth level in the sampling phase T1, the fourth switch 80 is turned on, and the gate terminal 31 is electrically connected with the drain terminal 33, such that voltage $V_G$ at the gate terminal 31 in the sampling phase T1 satisfies: $V_G = V_{SCAN} - V_{TH}$. The second control voltage is at the sixth level in the data writing phase T2 and the light-emitting phase T3, and the fourth switch 80 is turned off.

In an implementation, referring to FIG. 1, the pixel driving circuit 100 further includes a fifth switch 90. The fifth switch 90 includes a fifth control terminal 91, a ninth terminal 92, and a tenth terminal 93. The ninth terminal 92 is electrically connected with the drain terminal 133. The tenth terminal 93 is electrically connected with the positive terminal 41.

The pixel driving circuit 100 further includes a third control signal line 105 electrically connected with the fifth control terminal 91. The third control signal line 105 is configured to provide a third control voltage. The third control voltage is at a seventh level in the sampling phase T1 and the data writing phase T2. The third control voltage is at an eighth level in the light-emitting phase. One of the seventh level and the eighth level is a high level, and the other of the seventh level and the eighth level is a low level.

The third control voltage is at the seventh level in the sampling phase T1 and the data writing phase T2, and the fifth switch 90 is turned off, such that no voltage or current flows through the LED 40. The third control voltage is at the eighth level in the light-emitting phase T3, and the fifth switch 90 is turned on, such that the drain terminal 33 is able to be electrically connected with the positive terminal 41 and supply a driving current to the positive terminal 41, so as to drive the LED 40 to emit a light.

It should be noted that in an implementation, referring to FIG. 3, the fifth control terminal 91 is electrically connected with the first control signal line 103. The first control signal line 103 is configured to provide the first control voltage. The first control voltage is at the third level in the sampling phase T1 and the data writing phase T2. The first control voltage is at the fourth level in the light-emitting phase T3. One of the third level and the fourth level is a high level, and the other of the third level and the fourth level is a low level.

The first control voltage is at the third level in the sampling phase T1 and the data writing phase T2, and the fifth switch 90 is turned off, such that no voltage or current flows through the LED 40. The first control voltage is at the fourth level in the light-emitting phase T3, and the fifth switch 90 is turned on, such that the drain terminal 33 is able to be electrically connected with the positive terminal 41 and supply a driving current to the positive terminal 41, so as to drive the LED 40 to emit a light.

In other words, the first control signal line 103 and the third control signal line 105 are only signal lines with the same function in different implementations. For ease of description, the first control signal line 103 and the third control signal line 105 are named separately, and should not be construed as limitations to the present disclosure.

It should be noted that the fifth level includes but is not limited to a high level or a low level, the sixth level includes but is not limited to a high level or a low level, the seventh level includes but is not limited to a high level or a low level, and the eighth level includes but is not limited to a high level or a low level. A level of the fifth level, a level of the sixth level, a level of the seventh level, and a level of the eighth level are determined according to a TFT type of the third switch 70, a TFT type of the fourth switch 80, and a TFT type of the fifth switch 90.

For example, in an implementation, referring to FIG. 1 and FIG. 2, the driving transistor 30 and the second switch 60 each are a P-type TFT. The third switch 70, the fourth switch 80, and the fifth switch 90 each are an N-type TFT (e.g., a triode and a Field-Effect Transistor (FET)). The fifth level is the high level, the sixth level is at the low level, the seventh level is at the low level, and the eighth level is at the high level.

The second control voltage is at the fifth level in the sampling phase T1, the fifth level is the high level, and the third switch 70 is the N-type TFT, such that the third switch 70 is turned on. It is ensured that in the sampling phase T1, the data line 102 is electrically connected with the first capacitor-terminal 21. The fourth switch 80 is turned on due to the fourth switch 80 being the N-type TFT, such that the gate terminal 31 is electrically connected with the drain terminal 33, and voltage $V_G$ at the gate terminal 31 in the sampling phase T1 satisfies: $V_G=V_{SCAN}-V_{TH}$.

The third control voltage is at the seventh level in the sampling phase T1 and the data writing phase T2, the seventh level is the low level, and the fifth switch 90 is the N-type thin film transistor, such that the fifth switch 90 is turned off, and no voltage or current flows through the LED 40; and the third control voltage is at the eighth level in the light-emitting phase T3, and the eighth level is the high level, such that the fifth switch 90 is turned on, the drain terminal 33 is able to be electrically connected with the positive terminal 41, and a driving current is supplied to the positive terminal 41, so as to drive the LED 40 to emit a light.

Figure 5:
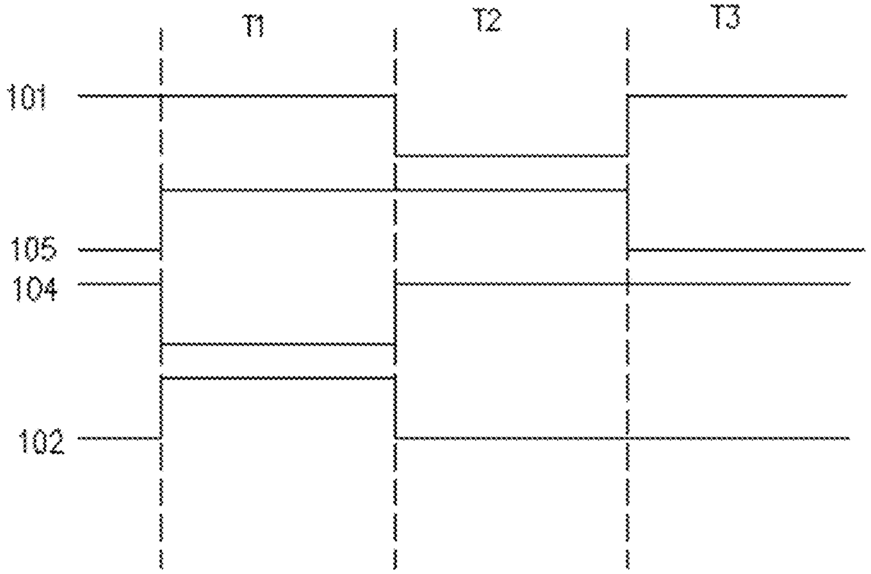
FIG. 5 is a sequence diagram of a pixel driving circuit provided other implementations of the present disclosure.

In another implementation, referring to FIG. 4 and FIG. 5, the driving transistor 30, the second switch 60, the third switch 70, the fourth switch 80, and the fifth switch 90 each are a P-type TFT (e.g., a triode and a FET). The seventh level is the high level, the eighth level is the low level, the fifth level is the low level, and the sixth level is the high level.

The second control voltage is at the fifth level in the sampling phase T1, the fifth level is the low level, and the third switch 70 is the P-type TFT, such that the third switch 70 is turned on. It is ensured that in the sampling phase T1, the data line 102 is electrically connected with the first capacitor-terminal 21. The fourth switch 80 is turned on due to the fourth switch 80 being the P-type TFT, such that the gate terminal 31 is electrically connected with the drain terminal 33, and voltage $V_G$ at the gate terminal 31 in the sampling phase T1 satisfies: $V_G=V_{SCAN}-V_{TH}$.

The third control voltage is at the seventh level in the sampling phase T1 and the data writing phase T2, the seventh level is the high level, the fifth switch 90 is the P-type TFT, such that the fifth switch 90 is turned off, and no voltage or current flows through the LED 40; and the third control voltage is at the eighth level in the light-emitting phase T3, and the eighth level is the low level, such that the fifth switch 90 is turned on, the drain terminal 33 is able to be electrically connected with the positive terminal 41, and a driving current is supplied to the positive terminal 41, so as to drive the LED 40 to emit a light.

Figure 6:
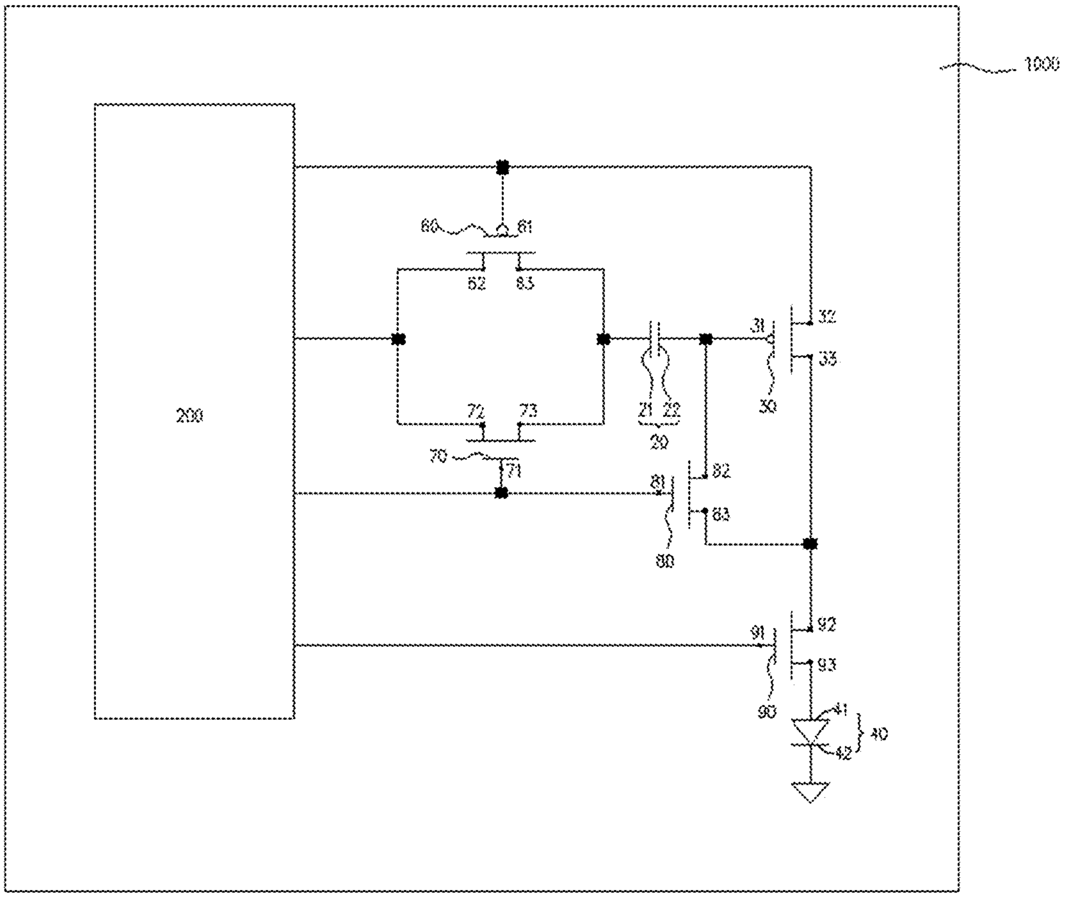
FIG. 6 is a circuit structural diagram of a display panel provided in other implementations of the present disclosure.

Referring to FIG. 6, a display panel 1000 is further provided in the present disclosure. The display panel 1000 includes a control chip 200 and the pixel driving circuit 100 provided in any one of the above implementations. The control chip 200 may be configured to control a level of the pixel driving circuit 100.

The pixel driving circuit 100 eliminates an influence of threshold voltage $V_{TH}$ on the driving current, such that the display of the LED 40 is stable, and the evenness of the display brightness of the display panel 1000 is improved, thereby greatly improving the display quality of the display panel 1000. In addition, the pixel driving circuit 100 may not be provided with a power supply line, and instead, the scan line 101 is utilized to replace the power supply line to supply a voltage to the pixel driving circuit 100, such that a voltage drop of a pixel driving voltage in each region of the display panel 1000 is greatly improved, which facilitates further improving the display evenness of the display panel 1000.

Optionally, the display panel 1000 includes, but is not limited to, an OLED display panel.

The above are some implementations of the present disclosure, and it should be noted that those of ordinary skill in the art may further make improvements and modifications without departing from the principle of the present disclosure, and these improvements and modifications shall also belong to the scope of protection of the present disclosure.

What is claimed is:

1. A pixel driving circuit, having an operating phase comprising a sampling phase, a data writing phase, and a light-emitting phase, the pixel driving circuit comprising:

a scan line configured to provide a scanning voltage, wherein the scanning voltage is at a first level in the sampling phase and the light-emitting phase, and at a second level in the data writing phase, one of the first level and the second level is a high level, and another of the first level and the second level is a low level;

a data line configured to provide a data voltage, wherein the data voltage is at a high level in the sampling phase, and at a low level in the data writing phase and in the light-emitting phase;

a capacitor comprising a first capacitor-terminal and a second capacitor-terminal, wherein the first capacitor-terminal is electrically connected with the data line in both the sampling phase and the data writing phase;

a switch module, wherein the switch module has one end electrically connected with the data line and another end electrically connected with the first capacitor-terminal, the switch module is configured to be turned on in the sampling phase and the data writing phase, and turned off in the light-emitting phase, and the switch module comprises a first switch, the first switch comprises a first control terminal, a first terminal, and a second terminal, the first terminal is electrically connected with the data line, and the second terminal is electrically connected with the first capacitor-terminal;

a driving transistor comprising a gate terminal, a source terminal, and a drain terminal, wherein the source terminal is electrically connected with the scan line, the gate terminal is electrically connected with the second capacitor-terminal, and the drain terminal is configured to be electrically connected with the gate terminal in the sampling phase and be disconnected from the gate terminal in the data writing phase; and a first control signal line electrically connected with the first control terminal, wherein the first control signal line is configured to provide a first control voltage, the first control voltage is at a third level in the sampling phase and the data writing phase, the first control voltage is at a fourth level in the light-emitting phase, one of the third level and the fourth level is a high level, and another of the third level and the fourth level is a low level.

2. The pixel driving circuit of claim 1, further comprising a Light-Emitting Diode (LED), the LED has a positive terminal and a negative terminal, the negative terminal is grounded, and the positive terminal is configured to be disconnected from the drain terminal in both the sampling phase and the data writing phase; and the positive terminal is configured to be electrically connected with the drain terminal in the light-emitting phase.

3. The pixel driving circuit of claim 2, wherein the switch module comprises a second switch and a third switch, the second switch comprises a second control terminal, a third terminal, and a fourth terminal, and the third switch comprises a third control terminal, a fifth terminal, and a sixth terminal;

the third terminal and the fifth terminal each are electrically connected with the data line, and the fourth terminal and the sixth terminal each are electrically connected with the first capacitor-terminal; and the second control terminal is electrically connected with the scan line, the pixel driving circuit further comprises a second control signal line electrically connected with the third control terminal, the second control signal line is configured to provide a second control voltage, the second control voltage is at a fifth level in the sampling phase, the second control voltage is at a sixth level in the data writing phase and the light-emitting phase, one of the fifth level and the sixth level is a high level, and another of the fifth level and the sixth level is a low level.

4. The pixel driving circuit of claim 3, further comprising a fourth switch, wherein the fourth switch comprises a fourth control terminal, a seventh terminal, and an eighth terminal, the seventh terminal is electrically connected with the gate terminal, the eighth terminal is electrically connected with the drain terminal, and the fourth control terminal is electrically connected with the second control signal line.

5. The pixel driving circuit of claim 4, further comprising a fifth switch, wherein the fifth switch comprises a fifth control terminal, a ninth terminal, and a tenth terminal, the ninth terminal is electrically connected with the drain terminal, and the tenth terminal is electrically connected with the positive terminal; and the pixel driving circuit further comprises a third control signal line electrically connected with the fifth control terminal, the third control signal line is configured to provide a third control voltage, the third control voltage is at a seventh level in the sampling phase and the data writing phase, the third control voltage is at an eighth level in the light-emitting phase, one of the seventh level and the eighth level is a high level, and another of the seventh level and the eighth level is a low level.

6. The pixel driving circuit of claim 5, wherein the driving transistor and the second switch each are a P-type Thin Film Transistor (TFT), the third switch, the fourth switch, and the fifth switch each are an N-type TFT, the fifth level is the high level, the sixth level is the low level, the seventh level is the low level, and the eighth level is the high level.

7. The pixel driving circuit of claim 5, wherein the driving transistor, the second switch, the third switch, the fourth switch, and the fifth switch each are a P-type TFT, the fifth level is the low level, the sixth level is the high level, the seventh level is the high level, and the eighth level is the low level.

8. A display panel comprising a pixel driving circuit, wherein the pixel driving circuit has an operating phase comprising a sampling phase, a data writing phase, and a light-emitting phase, and the pixel driving circuit comprises:

a scan line configured to provide a scanning voltage, wherein the scanning voltage is at a first level in the sampling phase and the light-emitting phase, and at a second level in the data writing phase, one of the first level and the second level is a high level, and another of the first level and the second level is a low level;

a data line configured to provide a data voltage, wherein the data voltage is at a high level in the sampling phase, and at a low level in the data writing phase and in the light-emitting phase;

a capacitor comprising a first capacitor-terminal and a second capacitor-terminal, wherein the first capacitor-terminal is electrically connected with the data line in both the sampling phase and the data writing phase;

a switch module, wherein the switch module has one end electrically connected with the data line and another end electrically connected with the first capacitor-terminal, the switch module is configured to be turned on in the sampling phase and the data writing phase, and turned off in the light-emitting phase, and the switch module comprises a first switch, the first switch comprises a first control terminal, a first terminal, and a second terminal, the first terminal is electrically connected with the data line, and the second terminal is electrically connected with the first capacitor-terminal;

a driving transistor comprising a gate terminal, a source terminal, and a drain terminal, wherein the source terminal is electrically connected with the scan line, the gate terminal is electrically connected with the second capacitor-terminal, and the drain terminal is configured to be electrically connected with the gate terminal in the sampling phase and be disconnected from the gate terminal in the data writing phase; and a first control signal line electrically connected with the first control terminal, wherein the first control signal line is configured to provide a first control voltage, the first control voltage is at a third level in the sampling phase and the data writing phase, the first control voltage is at a fourth level in the light-emitting phase, one of the third level and the fourth level is a high level, and another of the third level and the fourth level is a low level.

9. The display panel of claim 8, wherein the pixel driving circuit further comprises a Light-Emitting Diode (LED), the LED has a positive terminal and a negative terminal, the negative terminal is grounded, and the positive terminal is configured to be disconnected from the drain terminal in both the sampling phase and the data writing phase; and the positive terminal is configured to be electrically connected with the drain terminal in the light-emitting phase.

10. The display panel of claim 9, wherein the switch module comprises a second switch and a third switch, the second switch comprises a second control terminal, a third terminal, and a fourth terminal, and the third switch comprises a third control terminal, a fifth terminal, and a sixth terminal;

the third terminal and the fifth terminal each are electrically connected with the data line, and the fourth terminal and the sixth terminal each are electrically connected with the first capacitor-terminal; and the second control terminal is electrically connected with the scan line, the pixel driving circuit further comprises a second control signal line electrically connected with the third control terminal, the second control signal line is configured to provide a second control voltage, the second control voltage is at a fifth level in the sampling phase, the second control voltage is at a sixth level in the data writing phase and the light-emitting phase, one of the fifth level and the sixth level is a high level, and another of the fifth level and the sixth level is a low level.

11. The display panel of claim 10, wherein the pixel driving circuit further comprises a fourth switch, the fourth switch comprises a fourth control terminal, a seventh terminal, and an eighth terminal, the seventh terminal is electrically connected with the gate terminal, the eighth terminal is electrically connected with the drain terminal, and the fourth control terminal is electrically connected with the second control signal line.

12. The display panel of claim 11, wherein the pixel driving circuit further comprises a fifth switch, the fifth switch comprises a fifth control terminal, a ninth terminal, and a tenth terminal, the ninth terminal is electrically connected with the drain terminal, and the tenth terminal is electrically connected with the positive terminal; and the pixel driving circuit further comprises a third control signal line electrically connected with the fifth control terminal, the third control signal line is configured to provide a third control voltage, the third control voltage is at a seventh level in the sampling phase and the data writing phase, the third control voltage is at an eighth level in the light-emitting phase, one of the seventh level and the eighth level is a high level, and another of the seventh level and the eighth level is a low level.

13. The display panel of claim 12, wherein the driving transistor and the second switch each are a P-type Thin Film Transistor (TFT), the third switch, the fourth switch, and the fifth switch each are an N-type TFT, the fifth level is the high level, the sixth level is the low level, the seventh level is the low level, and the eighth level is the high level.

14. The display panel of claim 12, wherein the driving transistor, the second switch, the third switch, the fourth switch, and the fifth switch each are a P-type TFT, the fifth level is the low level, the sixth level is the high level, the seventh level is the high level, and the eighth level is the low level.

* * * * *